US010301913B2

(12) United States Patent
Dykstra et al.

(10) Patent No.: US 10,301,913 B2
(45) Date of Patent: *May 28, 2019

(54) OPTIMIZING RUNNING OPERATIONS (71) Applicant: HALLIBURTON ENERGY SERVICES, INC., Houston, TX (US)

(72) Inventors: Jason D. Dykstra, Sping, TX (US); Zhijie Sun, Spring, TX (US)

(73) Assignee: Halliburton Energy Services, Inc., Houston, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 15/328,834

(22) PCT Filed: Dec. 31, 2014

(86) PCT No.: PCT/US2014/073008
§ 371 (c)(1),
(2) Date: Jan. 24, 2017

(87) PCT Pub. No.: WO2016/108891
PCT Pub. Date: Jul. 7, 2016

(65) Prior Publication Data
US 2017/0218728 A1    Aug. 3, 2017

(51) Int. Cl.
*E21B 41/00* (2006.01)
*E21B 47/00* (2012.01)
(Continued)

(52) U.S. Cl.
CPC .......... *E21B 41/0092* (2013.01); *E21B 19/00* (2013.01); *E21B 44/00* (2013.01); *E21B 47/00* (2013.01); *E21B 47/0005* (2013.01)

(58) Field of Classification Search
CPC ...... E21B 41/0092; E21B 21/08; E21B 33/14; E21B 41/00; E21B 43/26; E21B 43/267;
(Continued)

(56) References Cited

U.S. PATENT DOCUMENTS

| 5,572,420 A | 11/1996 | Lu |
| 2008/0059002 A1* | 3/2008 | Hartkamp ............. G05B 15/02 700/299 |

(Continued)

FOREIGN PATENT DOCUMENTS

| WO | 2010027366 A1 | 3/2010 |
| WO | 2012/021995 | 2/2012 |

(Continued)

OTHER PUBLICATIONS

PCT International Search Report and Written Opinion, dated Sep. 30, 2015, Appl No. PCT/US14/73010, "Optimizing Completion Operations," Filed Dec. 31, 2014, 12 pgs.
(Continued)

*Primary Examiner* — Brian W Wathen
*Assistant Examiner* — Alicia M. Choi
(74) *Attorney, Agent, or Firm* — Jason Sedano; Parker Justiss, P.C.

(57) ABSTRACT

A system for optimizing a running operation includes an interface to equipment and sensors for performing the running operation. The interface supplies control signals to the equipment and obtains measurement signals from the sensors. The system further includes a short-term optimizer that derives a current job state based at least in part on the measurement signals, and that further adjusts the control signals to optimize a short-term cost function. The short-term cost function includes a difference between the current job state and a desired job state derived from optimized values of a set of decision variables. The system further includes a long-term optimizer module that determines the optimized values based on a long-term cost function, the long-term cost function accounting for at least a long-term reward and a final state cost.

20 Claims, 8 Drawing Sheets (51) Int. Cl.
*E21B 19/00* (2006.01)
*E21B 44/00* (2006.01)

(58) Field of Classification Search
CPC .......... E21B 44/00; E21B 47/12; E21B 43/00;
E21B 19/086; G05B 13/041; G05B
19/0426; G06Q 10/06; G06Q 10/1053;
G06Q 40/06; G06Q 99/005
USPC .......................................................... 700/282
See application file for complete search history.

(56) References Cited

U.S. PATENT DOCUMENTS

| | | |
|---|---|---|
| 2008/0164021 A1 | 7/2008 | Dykstra |
| 2009/0076873 A1* | 3/2009 | Johnson ................. G06Q 10/06 705/7.28 |
| 2009/0165548 A1 | 7/2009 | Pop et al. |
| 2011/0098931 A1 | 4/2011 | Kosmala et al. |
| 2011/0209868 A1 | 9/2011 | Dusterhoft et al. |
| 2012/0043079 A1 | 2/2012 | Wassouf et al. |
| 2012/0179444 A1 | 7/2012 | Ganguly et al. |
| 2012/0285701 A1 | 11/2012 | Cheng et al. |
| 2013/0006429 A1* | 1/2013 | Shanmugam ............. F02C 9/42 700/286 |
| 2013/0140031 A1 | 6/2013 | Cohen et al. |
| 2013/0343858 A1* | 12/2013 | Flusche ................... E21B 7/026 414/800 |
| 2014/0151121 A1 | 6/2014 | Boone et al. |
| 2014/0299315 A1 | 10/2014 | Chuprakov et al. |
| 2014/0374108 A1* | 12/2014 | Vandeponseele ..... E21B 43/166 166/308.2 |
| 2016/0281607 A1* | 9/2016 | Asati ......................... F02C 9/28 |
| 2016/0340568 A1* | 11/2016 | Natali .................... C09K 8/584 |
| 2016/0356127 A1 | 12/2016 | Dykstra et al. |
| 2017/0322579 A1* | 11/2017 | Goparaju ............. G06N 99/005 |
| 2017/0335665 A1* | 11/2017 | Saleri ....................... G01V 1/50 |

FOREIGN PATENT DOCUMENTS

| | | |
|---|---|---|
| WO | 2016/108883 | 7/2016 |
| WO | 2016/108893 | 7/2016 |
| WO | 2016108891 A1 | 7/2016 |

OTHER PUBLICATIONS

PCT International Search Report and Written Opinion, dated Sep. 30, 2015, Appl No. PCT/US14/73008, "Optimizing Running Operations," Filed Dec. 31, 2014, 11 pgs.

PCT International Search Report and Written Opinion, dated Dec. 31, 2014, Appl No. PCT/US14/72986, "Optimizing Stimulation and Fluid Management Operations," Filed Aug. 31, 2015, 10 pgs.

\* cited by examiner

OPTIMIZING RUNNING OPERATIONS

BACKGROUND

When performing an oilfield operation, decisions are often complex because of the large number and kinds of considerations to be taken into account, including the uncertainty of the risks and rewards that may only be discovered during the operation. Risk and reward analysis is an important part of the decision-making process for oil exploration and production for several reasons. First, risk and reward analysis provides a means for prioritizing the large number and kinds of decisions. Next, risk and reward analysis provides an approach for balancing value tradeoffs and different preferences of the stakeholders in the decision process. For example, a balance may be achieved between the conflicting goals of drilling as fast as possible, maintaining integrity of the formation, and ensuring on-site safety.

Current modeling of risks and rewards lacks accuracy and flexibility in the face of changing conditions. Specifically, unexpected high-risk events are addressed in an ad-hoc manner during the operation, and unexpected rewards associated with little risk are not pursued.

BRIEF DESCRIPTION OF THE DRAWINGS

Accordingly, there are disclosed herein certain oilfield operation optimization systems and methods. In the following detailed description of the various disclosed embodiments, reference will be made to the accompanying drawings in which.

It should be understood, however, that the specific embodiments given in the drawings and detailed description thereto do not limit the disclosure. On the contrary, they provide the foundation for one of ordinary skill to discern the alternative forms, equivalents, and modifications that are encompassed together with one or more of the given embodiments in the scope of the appended claims.

NOTATION AND NOMENCLATURE

Certain terms are used throughout the following description and claims to refer to particular system components and configurations. As one skilled in the art will appreciate, companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . .". Also, the term "couple" or "couples" is intended to mean either an indirect or a direct electrical connection. Thus, if a first device couples to a second device, that connection may be through a direct electrical connection, or through an indirect electrical connection via other devices and connections. In addition, the term "attached" is intended to mean either an indirect or a direct physical connection. Thus, if a first device attaches to a second device, that connection may be through a direct physical connection, or through an indirect physical connection via other devices and connections.

DETAILED DESCRIPTION

Figure 1:
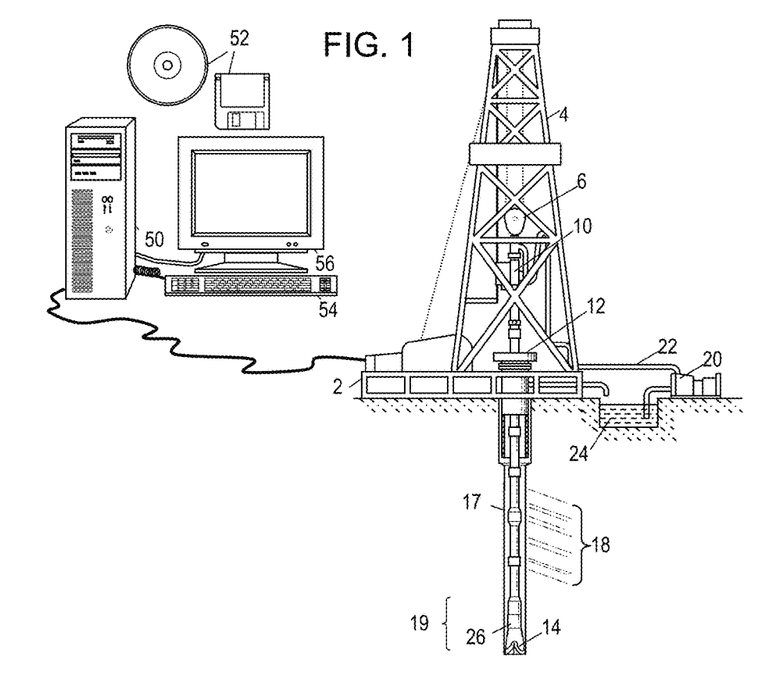
FIG. 1 is a contextual view of an illustrative drilling environment.

The issues identified in the background are at least partly addressed by systems and methods for optimizing oilfield operations. FIG. 1 shows an illustrative drilling environment. A drilling platform 2 supports a derrick 4 having a traveling block 6 for raising and lowering a bottomhole assembly (BHA) 19. The platform 2 may also be located offshore for subsea drilling purposes in at least one embodiment. The BHA 19 may include one or more of a rotary steerable system, logging while drilling system, drill bit 14, reamer, and downhole motor 26. A top drive 10 supports and rotates the BHA 19 as it is lowered through the wellhead 12. The drill bit 14 and reamer may also be driven by the downhole motor 26. As the drill bit 14 and reamer rotate, they create a borehole 17 that passes through various formations 18. A pump 20 circulates drilling fluid 24 through a feed pipe 22, through the interior of the drill string to the drill bit 14. The fluid exits through orifices in the drill bit 14 and flows upward to transport drill cuttings to the surface where the fluid is filtered and recirculated.

A data processing system 50 may be coupled to a measurement unit on the platform 2, and may periodically obtain data from the measurement unit as a function of position and/or time. Software (represented by information storage media 52) may run on the data processing system 50 to collect the data and organize it in a file or database. The software may respond to user input via a keyboard 54 or other input mechanism to display data as an image or movie on a monitor 56 or other output mechanism. The software may process the data to optimize oilfield operations as described below.

In running operations such as drilling operations, short-term rewards may include weight-on-bit (WOB) and drillstring rotations-per-minute (RPM). A higher weight on the bit 14 and faster RPM are preferable as both are factors in increasing the rate of penetration (ROP) into the formation 18. The short-term risks may include a region of vibration. Specifically, as the WOB and RPM increase, vibrations in the drillstring become increasingly likely. These vibrations interfere with the structural integrity of the drillstring components and also add noise to the drilling system. The long-term rewards may include an increase in ROP. The long-term rewards may also include a decrease in maximum dogleg severity. A dogleg is a bend in the borehole 17. Dogleg severity is a measure of the amount of change in the inclination, and/or azimuth of the borehole 17. By decreasing the dogleg severity, the strain on the drillstring and other downhole components is decreased.

In fluid management operations such as drilling fluid operations, long-term risks may include formation damage if the drilling fluid 24 does not prevent undesired formation fluid from entering the borehole 17. Such formation damage may occur if the composition and density of the drilling fluid 24 is not tailored to the formation. Long-term rewards may include lowering the cost of drilling fluid, e.g., by changing the composition of the drilling fluid 24 to use cheaper ingredients, but still tailoring the drilling fluid 24 to the formation 18. Long-term rewards may also include increasing the production rate of drilling fluid, i.e., increasing the rate at which useable drilling fluid is available.

In running operations such as hydraulic workover operations, where an underperforming well is reworked with hydraulic workover pipe to increase performance, short-term rewards may include increased hydraulic workover pipe insertion speed. The short-term risks may include release of downhole pressure during the workover operation. The long-term rewards may include increased hydraulic workover pipe insertion speed, which reduces the total time needed for the hydraulic workover operation.

Figure 2:
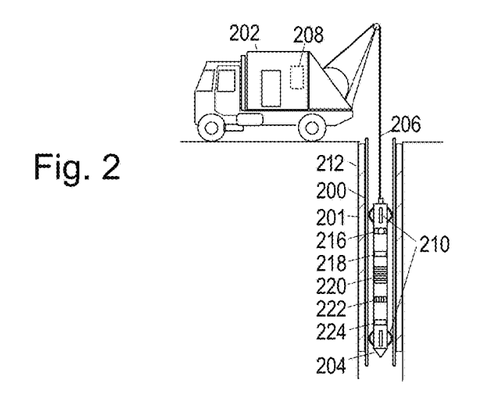
FIG. 2 is a contextual view of an illustrative logging and cementing environment.

FIG. 2 shows an illustrative logging and cementing environment. As sections of the borehole 212 are completed, the drill string may be removed from the borehole 212 and replaced by a casing string 200. A cement slurry is pumped into the annular space between the casing string 200 and the wall of the borehole 212, and the slurry hardens to form a cement sheath 201. Ideally, the cement slurry displaces the drilling fluid and other materials from the annulus to form a continuous sheath that binds to the formation and tubing to seal the annulus against fluid flow. Various cement slurry compositions have been developed to provide various desirable features such as a density that can be tailored to avoid damage to the formation, a viscosity that is low enough to facilitate pumping and high enough to minimize mixing with other fluids, an ability to bind to the formation and casing material, and in some instances, a "self-healing" ability to seal any cracks that develop. Certain cement resin formulations offer an extremely adjustable set of properties.

Once the cementing job has been completed (i.e., the slurry has been pumped into position and allowed to set), a wireline logging suite is typically employed to evaluate the sheath and verify that the desired placement and sheath quality have been achieved. For example, a cement crew may verify that the previous materials have been displaced in the regions where formation fluid inflows might otherwise occur and that there are no bubbles, gaps, or flow paths along the sheath.

Next, a logging truck 202 may suspend a wireline logging sonde 204 on a wireline cable 206 having conductors for transporting power to the sonde and telemetry from the sonde to the surface. On the surface, a computer 208 acquires and stores measurement data from the logging tools in the sonde 204 as a function of position along the borehole and as a function of azimuth. The illustrated sonde 204 includes an ultrasonic scanning tool 216 and a cement bond logging (CBL) tool having an omnidirectional source 218, an acoustic isolator 220, an azimuthally-sensitive receiver 222, and an omnidirectional receiver 224. Centralizers 210 keep the sonde centered. The wireline sonde may further include an orientation module and a control/telemetry module for coordinating the operations of the various tools and communications between the various instruments and the surface. The ultrasonic scanning tool 216 has a rotating transceiver head that transmits ultrasonic pulses and receives reflected pulses to and from many points on the inner circumference of the casing. The amplitudes of the initial reflection from the inner surface of the casing and subsequent reflections from the outer surface of the casing and acoustic interfaces beyond the casing are indicative of the acoustic impedances of the casing and the annular materials beyond the casing. The acoustic interfaces can be mapped by tracking the travel time of each reflection. The CBL tool uses the acoustic source 218 to generate acoustic pulses that propagate along the casing string. The acoustic isolator 220 suppresses propagation of acoustic signals through the sonde itself. The receivers 222 and 224 detect the waveforms of the propagating acoustic signals, which have characteristics indicative of the quality of the cement sheath. For example, the maximum amplitude of the waveforms relative to the transmitted pulse varies with the quality of the bond between the casing and the cement.

In completion operations such as cementing operations, a short-term reward may include increased cement pumping rate, which decreases the total time needed for a cement job. The short-term risks may include formation of a bubble, uneven cement surface, and poor cement bond, which decrease the integrity of the cement. The long-term risks may include complete loss of cement integrity and low fracture gradient, which is the pressure required to fracture the cement. The long-term rewards may include increased cement integrity, decreased wait-on-cement time, and decreased material cost. For example, the type or formulation of cement may be tailored to the cement operation to decrease material cost.

In running operations such as logging operations, short-term risks may include increased measurement noise, which is undesirable because increased noise decreases the accuracy of the logging data. Short-term risks may also include biased measurements, which may result in persistent errors in the logging data. The long-term risks may include creation of inaccurate formation models and inaccurate reservoir models after completion of the logging operations. The long-term rewards may include increased logging speed, which decreases the total time needed for the logging operations, and increased logging resolution, which increases the accuracy of the logging data and models.

Figure 3:
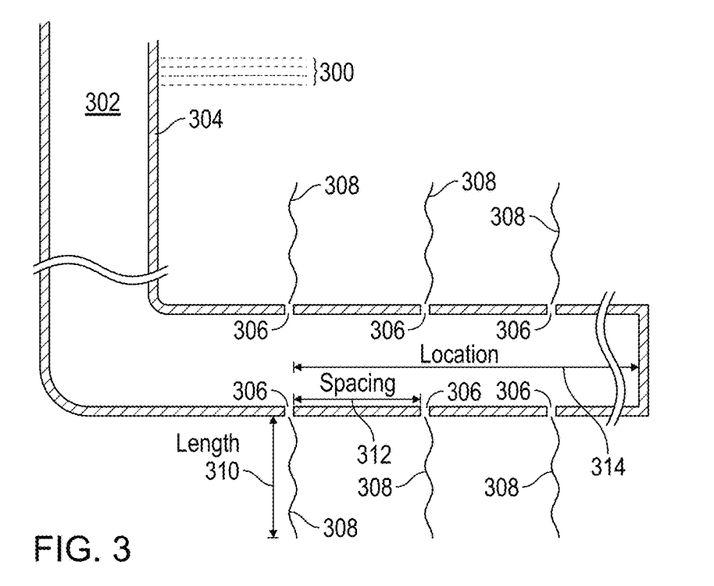
FIG. 3 is a contextual view of an illustrative hydraulic fracturing environment.

FIG. 3 shows an illustrative hydraulic fracturing environment in which a borehole 302 has been drilled into the target formation 300. The borehole 302 has been cased with a casing 304 and cemented to sustain the structural integrity and stability of the borehole 302. The target formation 300 may include multiple layers, each layer with a different type of rock formation, including the hydrocarbon-containing target formation within which the borehole may extend horizontally for some distance. The casing 304 contains multiple perforations 306 through which a fracturing fluid, such as water, is injected at high pressure into the target formation. This high-pressure fluid injection creates and opens fractures 308 that extend through the target formation. The high-pressure fluid may contain additional chemicals and materials, such as a proppant material (e.g., sand) that maintains the structural stability of the fractures and prevents the fractures from fully collapsing. Typically, the horizontal portions of the borehole are drilled generally parallel to the direction of maximum stress, causing the fractures to propagate generally perpendicular to the borehole. (As fractures tend to propagate perpendicular to the direction of maximum stress, such propagation may be expected to occur at a predictable angle from the borehole axis when the borehole is not aligned with the maximum stress direction.) The overlying and underlying formation layers tend to resist fracture propagation, consequently fractures tend to propagate laterally within the target formation, to a length that depends on the rate and volume of the injected fracturing fluid. Thus, each fracture has a length 310 relative to the casing 304. Each fracture also has an initiation location 314 determined by the perforation position, which is typically measured relative to the distal end of the borehole 302. Where regular spacing is employed, the perforations (and hence the fracture initiation points) have a fixed spacing 312 between them.

In stimulation operations such as hydraulic fracturing operations, the long-term risks may include unsuitable locations for hydraulic fracturing, e.g., if the formation 300 includes material that resists fracturing. The long-term risks may also include incompatibility between fracturing fluid and formation, wherein the proppants are ineffective or fracturing fluid damages or contaminates the formation, and proppant screen out, wherein the proppant prevents the desired hydrocarbons from entering the borehole.

Figure 4:
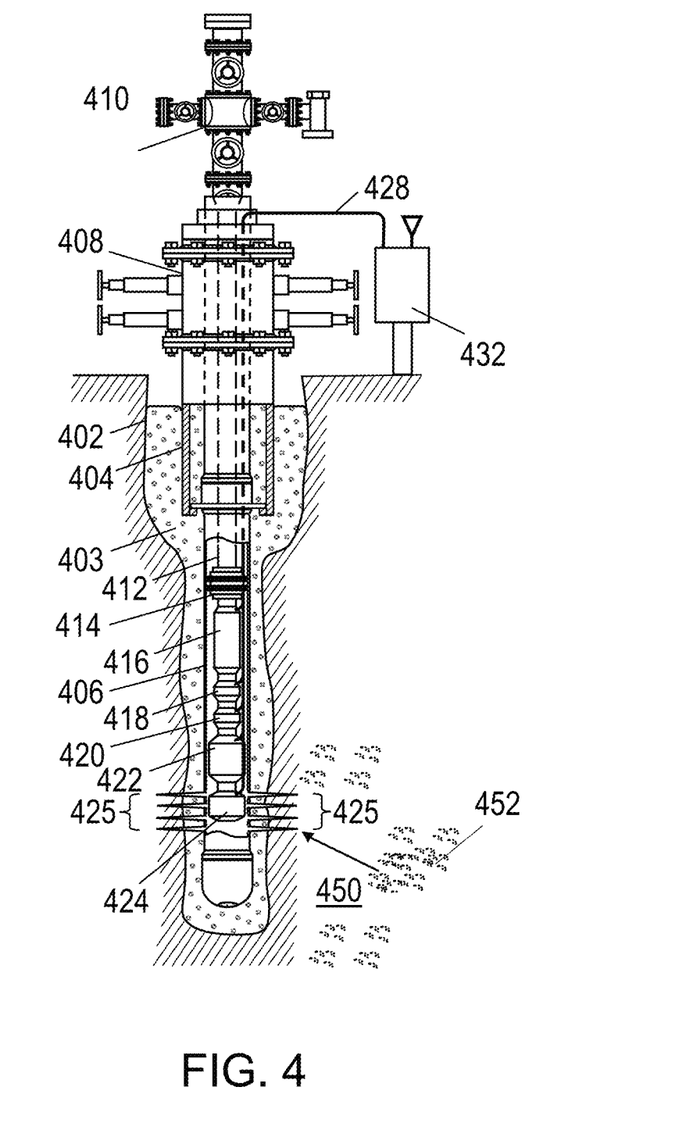
FIG. 4 is a contextual view of an illustrative well completion environment.

FIG. 4 shows an illustrative well completion environment. Specifically, FIG. 4 shows an example of a producer well with a borehole 402 that has been drilled into the earth. The producer well also includes a casing header 404 and a casing 406, both secured into place by cement 403. A blowout preventer (BOP) 408 couples to the casing header 404 and to a production wellhead 410, which together seal in the well head and enable fluids to be extracted from the well in a safe and controlled manner Measured well data is periodically sampled and collected from the producer well and combined with measurements from other wells within a reservoir, enabling the overall state of the reservoir to be monitored and assessed. These measurements may be taken using a number of different downhole and surface instruments, including but not limited to, a temperature and pressure sensor 418 and a flow meter 420. Additional devices also coupled in line to a production tubing 412 include a downhole choke 416 (used to vary the fluid flow restriction), an electric submersible pump (ESP) 422 (which draws in fluid flowing from perforations 425 outside the ESP 422 and production tubing 412), an ESP motor 424 (to drive the ESP 322), and a packer 414 (isolating the production zone below the packer from the rest of the well). Additional surface measurement devices may be used to measure, for example, the tubing head pressure and the electrical power consumption of the ESP motor 424.

Each of the devices along the production tubing 412 couples to a cable 428, which is attached to the exterior of the production tubing 412 and is run to the surface through the blowout preventer 408 where it couples to a control panel 432. The cable 428 provides power to the devices to which it couples, and further provides signal paths (electrical, optical, etc.) that enable control signals to be directed to the downhole devices, and for measurement signals to be received at the surface from the downhole devices. The devices may be controlled and monitored locally by field personnel using a user interface built into the control panel 432 coupled to an oilfield optimization system. Communication between control panel 432 and the oilfield optimization system may be via a wireless network (e.g., a cellular network), via a cabled network (e.g., a cabled connection to the Internet), or a combination of wireless and cabled networks.

If the formation 450 contains loose particulates 452 such as sands or soft sandstone, the particulates may migrate into the borehole through the perforations 425, clogging the production system and eroding the devices along the production tubing 412. To prevent this, fluid may be injected into the formation, and the fluid may react chemically or with heat to produce a permeable gel or solid to block the particulates 452 while allowing fluid flow. Also, a porous screen may be placed in the borehole between the production tubing 412 and the formation 450 wall. This technique is commonly referred to as gravel packing and the screen may include certain size rocks or gravel, Ottawa sand, walnut shells, glass beads, and the like.

In completion operations such as well completion operations, short-term rewards may include gravel-packing sand transport speed. A faster transport speed means that sand can be deployed to the annulus faster, thus decreasing total job time. Short-term risks may include thin gravel-packing carrier fluid and a sand dune effect, which occurs when an accumulation of sand decreases the production flow rate. The long-term risks may include damage to the reservoir. For example, the sands may enter the formation or reservoir and clog the conduit, thereby preventing hydrocarbons from escaping. The long-term rewards may include increased sand screening efficiency, wherein the porous screen or gel becomes more efficient, and an increase in borehole integrity.

Figure 5:
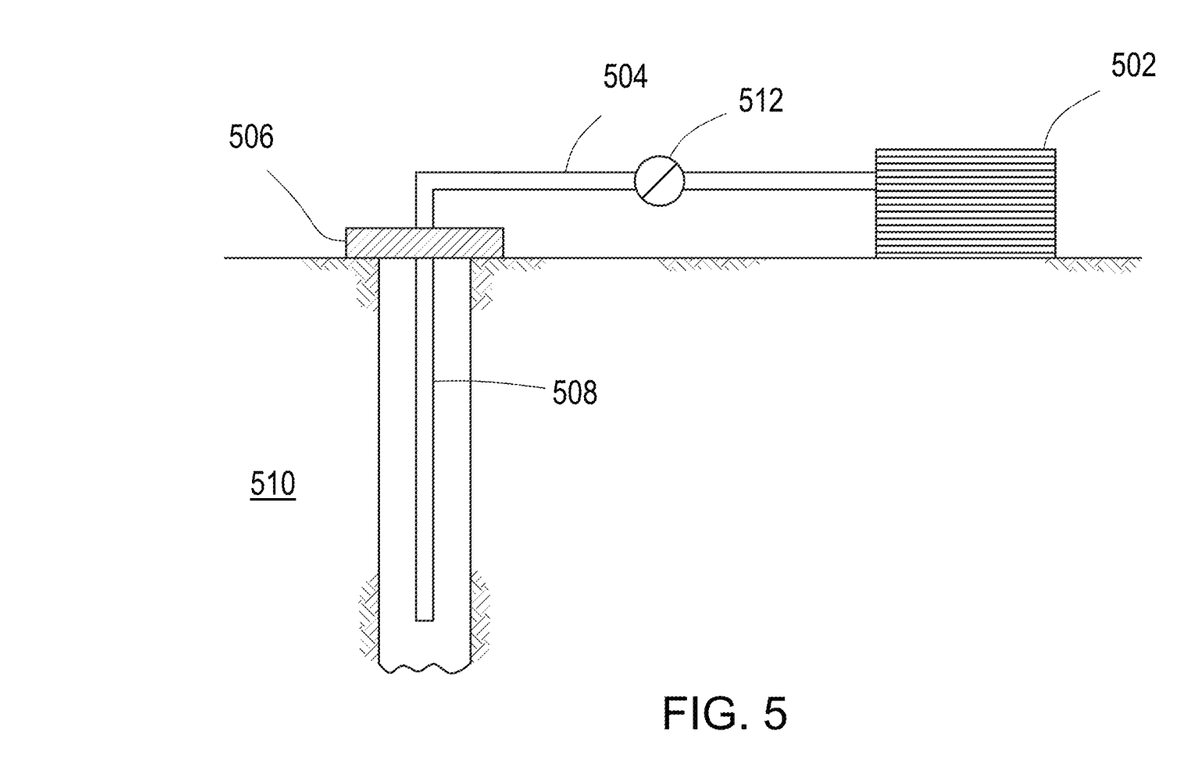
FIG. 5 is a contextual view of an illustrative formation treatment environment.

FIG. 5 shows an illustrative formation treatment environment. While FIG. 5 depicts a land-based system, like systems may be operated in subsea locations as well. A treatment fluid may be formulated in a mixing tank 502. The treatment fluid may be conveyed via line 504 to a wellhead 506, where the treatment fluid enters a tubular 508 extending from wellhead 506 into subterranean formation 510. Upon being ejected from tubular 508, the treatment fluid may subsequently penetrate into subterranean formation 510. Pump 512 may be configured to raise the pressure of the treatment fluid to a desired degree before its introduction into tubular 508. Various additional components may be present that have not necessarily been depicted in FIG. 5 in the interest of clarity. Non-limiting additional components that may be present include, but are not limited to, supply hoppers, valves, condensers, adapters, joints, gauges, sensors, compressors, pressure controllers, pressure sensors, flow rate controllers, flow rate sensors, temperature sensors, and the like. Although not depicted in FIG. 5, the treatment fluid may, in some embodiments, flow back to wellhead 506 and exit subterranean formation 510. In some embodiments, the treatment fluid that has flowed back to wellhead 506 may subsequently be recovered and recirculated to subterranean formation 510.

In fluid management operations such as production chemical operations, the short-term rewards may include an increase in production rate of the treatment fluid and increase in damage removal rate. For example, scale may appear at the wellbore, restricting the hydrocarbon flow. Pumping an acid into the wellbore can dissolve such scale. The short-term risks may include a temperature change downhole, requiring reformulation of the treatment fluid, and a change in the composition of the reservoir fluid. The long-term risks may include clogging of the borehole, and the long-term rewards may include increased separation capability of reservoir fluids, e.g. separation of water and oil, increase in production rate, and decrease in treatment fluid, or chemical, cost.

Figure 6A:
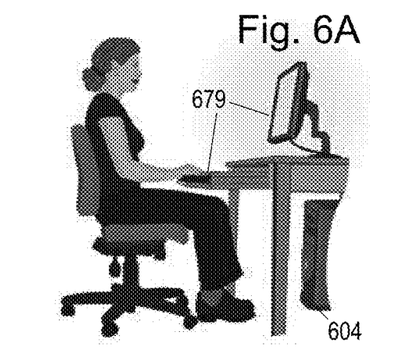
FIG. 6A is an illustration of a user interfacing with an illustrative risk and reward optimization system.

As shown in FIG. 6A, an analyst may employ a user interface 679 of a workstation 604 to view and/or control the optimization process. The workstation 604 is part of the hardware platform of an oilfield operation optimization system such as that shown in FIG. 6B. The illustrative hardware platform couples the workstation 604 to one or more multi-processor computers 606 via a local area network (LAN) 605. The one or more multi-processor computers 606 are in turn coupled via a storage area network (SAN) 608 to one or more shared storage units 610. Using the personal workstation 604, the analyst is able to load sensor and control data into the system, and to configure and monitor the processing of the sensor and control data.

Figure 6B:
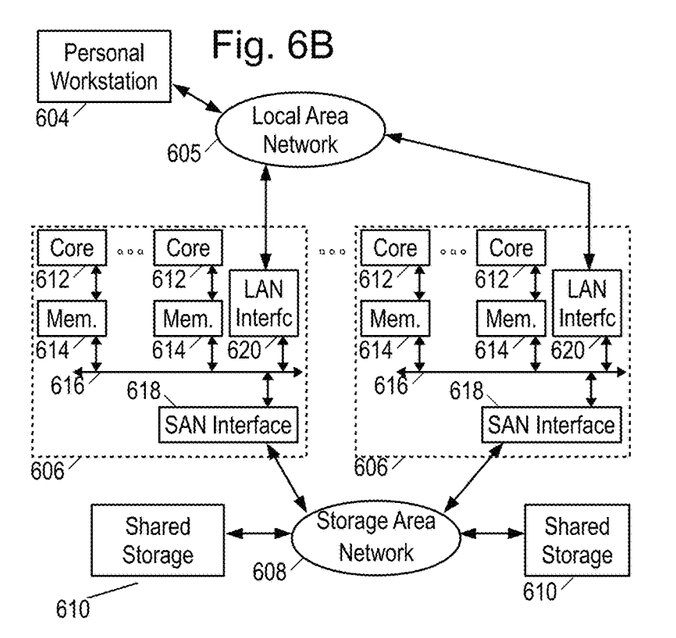
FIGS. 6B and 6C are a block diagrams of illustrative risk and reward optimization systems.

Personal workstation 604 may take the form of a desktop computer with a display that shows graphical representations of the input and result data, and with a keyboard that enables the user to move files and execute processing software. LAN 605 provides high-speed communication between multi-processor computers 606 and with personal workstation 604. The LAN 605 may take the form of an Ethernet network.

Multi-processor computer(s) 606 provide parallel processing capability to enable suitably prompt processing of the input data and measurement signals to derive the results data and control signals. Each computer 606 includes multiple processors 612, distributed memory 614, an internal bus 616, a SAN interface 618, and a LAN interface 620. Each processor 612 operates on allocated tasks to solve a portion of the overall optimization problem and contribute to at least a portion of the overall results. Associated with each processor 612 is a distributed memory module 614 that stores application software and a working data set for the processor's use. Internal bus 616 provides inter-processor communication and communication to the SAN or LAN networks via the corresponding interfaces 618, 620. Communication between processors in different computers 606 can be provided by LAN 605.

SAN 608 provides high-speed access to shared storage devices 610. The SAN 608 may take the form of, e.g., a Fibrechannel or Infiniband network. Shared storage units 610 may be large, stand-alone information storage units that employ magnetic disk media for nonvolatile data storage. To improve data access speed and reliability, the shared storage units 610 may be configured as a redundant disk array ("RAID").

Figure 6C:
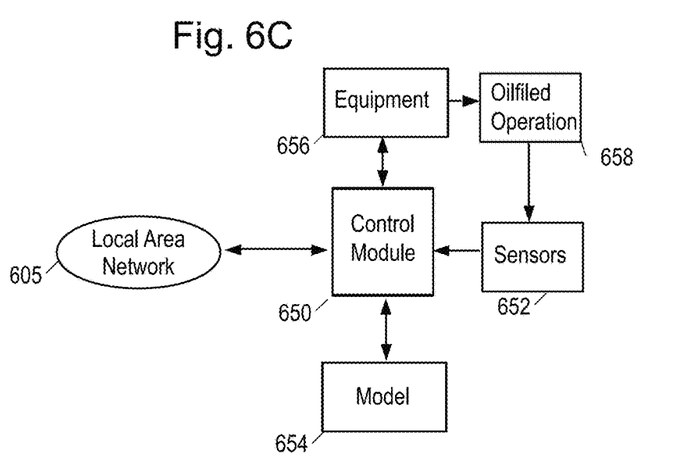

One or more cores 612 may make up a control module as shown in FIG. 6C. The control module 650 may receive measurement signals from sensors 652 that monitor the oilfield operation 658, and the control module 650 may send control signals to equipment 656 performing the oilfield operation 658. The control module 650 may read from and write to a model of the oilfield operation stored in memory. In at least one embodiment, the control module includes cores and memory, and as such, the control module 650 itself includes the model 654. The control module may be remotely coupled to the LAN 605 for communication purposes.

Figure 7:
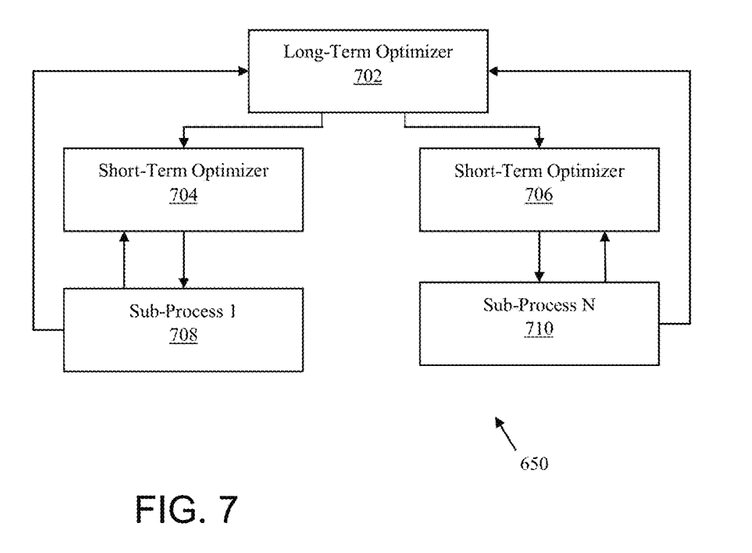
FIG. 7 is block diagram of an illustrative control module configuration in a risk and reward optimization system.

FIG. 7 shows an illustrative control module 650 for oilfield operation optimization. The control module 650 includes a long-term optimizer 702 coupled to one or more short-term optimizers 704, 706. Each short-term optimizer 704, 706 controls one or more sub-processes 708, 710 of the oilfield operation, and measurement signals from the sub-processes 708, 710 are fed back into the long-term optimizer 702, e.g. to update the operation model, and short-term optimizers 704, 706, e.g. to update the actual job state. The long-term optimizer 702 constrains the short-term optimizers 704, 706, e.g. with a desired job state, and the short term-optimizers 704, 706 control the oilfield operation within those constraints.

The long-term optimizer 702 maximizes a long-term cost function that includes one or more terms representing long-term rewards and one or more terms representing long-term risks. The long-term risks are static, or slow to change, over the job. Should a short-term risk persist over a threshold time period, the short-term risk may be promoted to a long-term risk. By maximizing the long-term cost function, the long-term optimizer 702 calculates an optimal design and passes the design to the short-term optimizers 704, 706. The long-term cost function may be in the following form:

$$\max\{\text{long-term rewards}-\text{costs}+\rho\cdot\text{long-term risks}\} \quad (1)$$

where p is a weighting factor balancing the long-term risks. Equation (1) for a particular oilfield operation, e.g., increasing the stimulated reservoir volume (SRV) in a hydraulic fracturing environment, may take the following form:

$$\max\{\text{SRV}-\text{material cost}-\text{supply chain cost}+\rho\cdot\text{long-term risks}\} \quad (2)$$

subject to
  $\text{SRV}=f_1(\text{DV})$
  $\text{material cost}=f_2(\text{DV})$
  $\text{supply chain cost}=f_3(\text{DV})$
  $\text{long-term risks}=f_4(\text{DV})$ where DV are decision variables. Similarly, equations may be formed for other oilfield operations including long-term rewards, costs, and long-term risks unique to those operations and discussed below. Due to the large number of decision variables, the long-term optimizer may only run every several hours or every several stages of the oilfield operation. The long-term optimizer may include one or more models that supplies the decision variables. For example, for a hydraulic fracturing operation, the models may include a Perkins-Kern-Nordgen model, a reservoir model, and a surface equipment model. The models only calculate final steady-state values of the variables and the intermediate responses are ignored in at least one embodiment. The inputs to the models may include measurement signals from the sub-processes 708, 710.

The short-term optimizer modules 704, 706 minimize a short-term cost function according to constraints, the optimized decision variables, from the long-term optimizer 702. The short term cost function may take the following form:

$$\min\{\rho_0\cdot||J_{act}-J_{des}||^2+\rho_1\cdot\text{short-term rewards}+\rho_2\cdot\text{short-term risks}\} \quad (3)$$

subject to
  $J_{des}=g_1(\text{DV}_{optimal})$
  $J_{act}=g_2(\text{job state})$
  short-term risks=$g_3$(job state)

where the vector $J_{des}$ contains the model design goals computed by the long-term optimizer and from the optimal long-term decision variables $\text{DV}_{optimal}$, and where the vector $J_{act}$ represents the current actual state of the job. $\rho_0$, $\rho_1$ and $\rho_2$ are the weighting factors balancing the model-based control and risk-reward control. Short-term risks are quick-to-change risks that only exist in a local operational region over a short temporal window. The short-term optimizer modules 704, 706 may derive the current job state based on the measurement signals received and the control signals sent, and deriving the current job state may be performed with an adaptive system model. The control module 650 may allocate portions of risk between the short-term cost function and the long-term cost function based on dynamic variability of those portions.

After minimizing the short-term cost function, the short-term optimizers 704, 706 send control signals based on the minimization to the equipment performing the oilfield operation, and the short-term optimizers continue to receive measurement data regarding the operation from sensors. The control signals may automatically, i.e. without human input, adjust the equipment to balance risk and reward based on the short-term cost function as constrained by the long-term cost function. Measurement data is fed back to the short-term optimizers 704, 706 as well as the long-term optimizer 702 as measurement signals for updating the model, updating the job state, and the like. The short-term optimizers 704, 706 may also send data to the long-term optimizer 702 to adjust the model design goals. The long-term cost function may include a coordination term to balance the rewards and risks among several short-term optimizers 704, 706.

The maximization of the long-term cost function can be computationally intensive, and as such, it may be computed less frequently than minimization of the short-term cost function, which may be computed continuously and in real time.

The model of the oilfield operation may take the form:

$$x(k+1)=Ax(k)+Bu(k)+w(k) \quad (4)$$

$$y(k)=Cx(k)+v(k) \quad (5)$$

where matrices A, B and C are the operation matrices and can be time-varying, and vector x(k) is the internal state of the operation. The vectors u(k) and y(k) are the input and output vectors of the operation, respectively. The process noise w(k) and measurement noise v(k) are considered to have a Gaussian distribution with covariance matrices W and V, respectively. The values of W and V can be from supplied from a user, learned from data, or measured directly by sensors. From Kalman filtering theory, the total uncertainty of the output y(k) can be represented by $$\Sigma_x(k+1)=A\Sigma_x(k)A^T+W-A\Sigma_x(k)C^T(C\Sigma_x(k)C^T+V)^{-1}C\Sigma_x(k)A^T \quad (6)$$

$$\Sigma_y(k)=C\Sigma_x(k)C^T+V(k) \quad (7)$$

where $\Sigma x$ is the uncertainty matrix of state vector x(k), $\Sigma y$ is the uncertainty matrix of output y(k), and the diagonal elements of $\Sigma_y$ are the uncertainty for individual decision variables. For example, in a hydraulic fracturing environment, the input vector may be $u(k)=[F(k) \ c_p(k)]^T$, where F(k) is the pump rate and $c_p(k)$ is the proppant concentration. The output vector may be $y(k)=[L(k) \ w(k)]^T$, where L(k) and w(k) are fracture length and width, respectively. The first and second diagonal elements, $\Sigma_{y,11}$ and $\Sigma_{y,22}$, of the uncertainty matrix $\Sigma_y$ provide an estimate of current uncertainty of fracture dimensions.

The weighting factors in the short-term optimizers 704, 706 may be adjusted dynamically according to the output uncertainty $\Sigma y$. If the uncertainty level is low, for example if $\Sigma_{y,11}$ and $\Sigma_{y,22}$, the diagonal elements of $\Sigma y$, are smaller than 10% of the values of corresponding variables $y_1$ and $y_2$ (e.g., L(k) and w(k) in the example in the previous paragraph), the system may be operated in model-based control mode, which may be interpreted as a setpoint tracking objective, and thus the weighting factors are set as $\rho_0=1$, $\rho_1=0$ and $\rho_2=0$. If the uncertainty level is high, for example if $\Sigma_{y,11}$ and $\Sigma_{y,22}$ are comparable with corresponding variables $y_1$ and $y_2$, the system may be operated in risk-reward control mode, leading to $\rho_0=1$, $\rho_1=1$ and $\rho_2=1$. If the uncertainty level is neither high nor low, for example if $\Sigma_{y,11}$ and $\Sigma_{y,22}$ are between 10% and 100% of corresponding variables $y_1$ and $y_2$, then the system may be operated in a hybrid of model-based control mode and risk-reward control mode, and the weights may be determined by the uncertainty. For example, if $\Sigma_{y,11}/y_1=0.5$ and $\Sigma_{y,11}/y_1=0.3$, the average value of uncertainty-to-signal ratio is 0.4. Based on this value, the weighting factors may be chosen as $\rho_0=0.6$, $\rho_1=0.4$ and $\rho_2=0.4$, meaning that 60% of the control effort is based on model-based control mode while 40% of the control effort is based on risk-reward control mode.

In hydraulic fracturing operations, the control signals may control or affect perforation density, borehole diameter, casing diameter, perforation diameter, fracturing fluid composition, proppant composition, gel breaker composition, pump rate, and proppant schedule. The long-term risks may include unsuitable locations for hydraulic fracturing, incompatibility between fracturing fluid and formation, and proppant screen out. The measurement signals of the hydraulic fracturing operation may include pressure and microseismic activity.

In drilling fluid operations, the control signals may affect or control pump rate, drilling fluid composition, fluid addition rate, rock cutting removal rate, and monitoring equivalent circulating density. The long-term risks may include equivalent circulating density below leak-off test and formation damage. Long-term rewards may include cost of drilling fluid and production rate of drilling fluid.

In well completion operations, short-term rewards may include including gravel-packing sand transport speed. Short-term risk may include thin gravel-packing carrier fluid and sand dune effect. Control signals may control or affect pump rate, gravel-packing sand concentration, and polymer composition. The measurement signals may include surface viscosity and pressure. The long-term risks may include reservoir damage and sand accumulation. The long-term rewards may include sand screening efficiency and borehole integrity.

In production chemical operations, the short-term rewards may include increase in production rate and increase in damage removal rate. The short-term risks may include downhole temperature change and reservoir fluid composition change. The control signals may control or affect the pump rate and chemical composition. The measurement signals may include separation of reservoir fluids, production rate, and damage removal rate. The long-term risks may include solid clogging. The long-term rewards may include separation capability of reservoir fluids, increase in production rate, and decrease in chemical cost.

In drilling operations, short-term rewards may include weight-on-bit and drillstring rotations-per-minute. The short-term risks may include a region of vibration. The long-term rewards may include, maximum dogleg severity, and rate of penetration. The control signals may control or affect the path taken by the bottomhole assembly.

In hydraulic workover operations, short-term rewards may include increased hydraulic workover pipe insertion speed. The short-term risks may include pressure release. The long-term risks may include incorrect hydraulic workover pipe location. The long-term rewards may include increased hydraulic workover pipe insertion speed and accurate hydraulic workover pipe location. The control signals may control or affect force of hydraulic workover pipe insertion, speed of hydraulic workover pipe insertion, type of hydraulic workover pipe, composition of hydraulic workover pipe, and diameter of hydraulic workover pipe. The measurement signals may include surface pressure and pipe end location.

In logging operations, short-term risks may include increased measurement noise, and biased measurements. The long-term risks may include inaccurate formation model and inaccurate reservoir model. The long-term rewards may include increased logging speed and increased logging resolution. The control signals may control or affect selection of logging tool and speed of logging tool.

In cementing operations, a short-term reward may include increased cement pumping rate. The short-term risks may include mud bubble, uneven cement surface, and poor cement bond. The long-term risks may include loss of cement integrity and low fracture gradient. The long-term rewards may include increased cement integrity, decreased wait-on-cement time, and decreased material cost. The control signals may control or affect cement type and cement composition. Measurement signals may include cement viscosity and cement pump rate.

Figure 8:
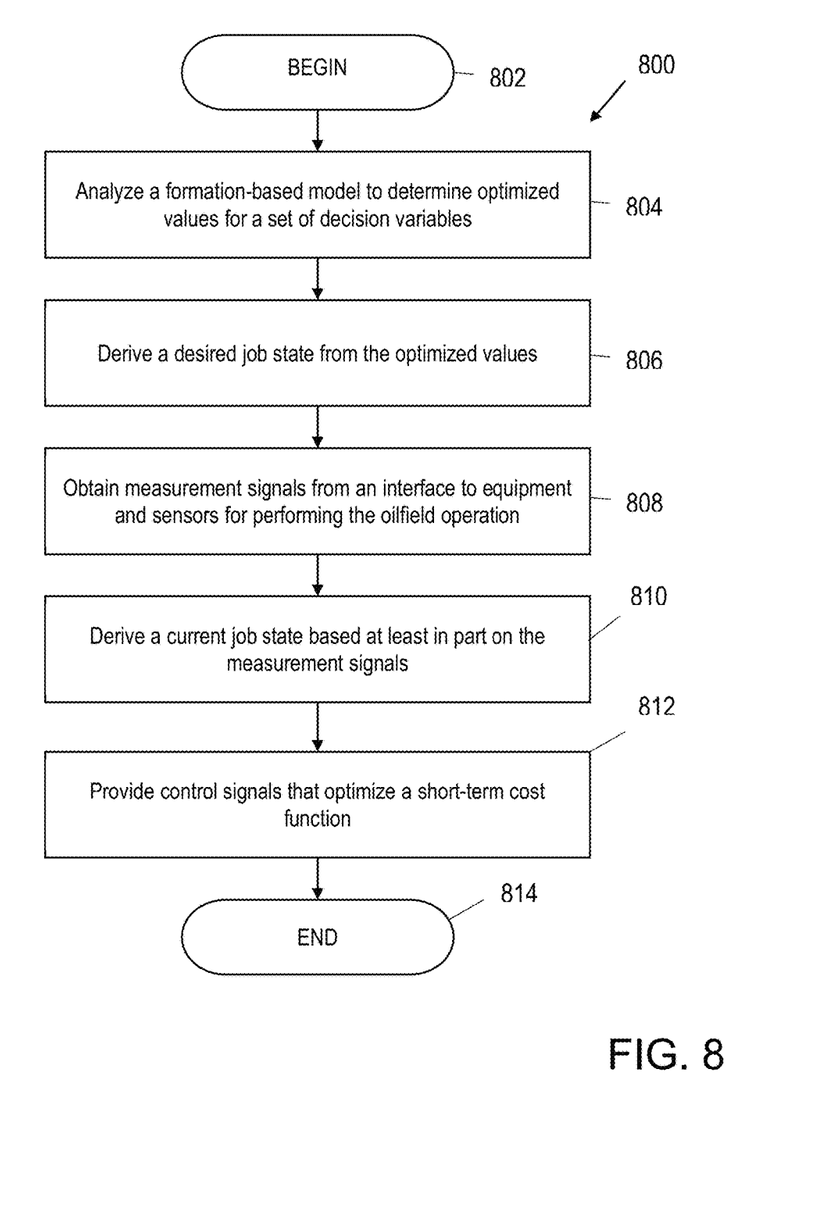
FIG. 8 is flow diagram of an illustrative risk and reward optimization method.

FIG. 8 is a flow diagram of an illustrative method 800 of optimizing oilfield operations, beginning at 802 and ending at 814. For clarity, the method 800 will be discussed using a hydraulic fracturing example, however, any oilfield operations in the above environments may be optimized using the optimization method 800. At 804, a formation-based model is analyzed to determine optimized values for a set of decision variables. For example, in a hydraulic fracturing operation the formation-based model may include a model of induced fractures, a model of a reservoir, and a model of surface equipment. The long-term cost function may be maximized for the long-term reward of stimulated reservoir volume (SRV), and as such the long-term optimizer may optimize the decision variables for proppant type, fluid type, gel type, and fracture plan (pump rate, proppant schedule, and the like) for each stage within the hydraulic fracturing job. The long-term risks used in the long-term cost function may be compatibility of fracturing fluid and formation and proppant screen-out. As such, the long-term optimizer may tend to select a cheaper fluid that is well-compatible with the formation and a proppant that is unlikely to screen out. At 806, a desired job state is derived from the optimized values. The desired job state is passed as constraints to the short-term optimizers.

At 808, measurement signals are obtained from an interface to equipment and sensors that perform the oilfield operation. These measurement signals are used to update the model of the oilfield operation and construct a current job state to be compared with the desired job state by the short-term optimizers. For a hydraulic fracturing operation, the measurement data may include pressure and microseismic activity measurements. At 810, a current job state is derived based on the measurement signals. The short-term optimizer may then minimize the short term cost function based on a comparison between the desired job state and the current job state. Additionally, short-term risks and rewards are taken into account as well. At 812, control signals are provided by the short-term optimizers that optimize the short-term cost function. For example, in a hydraulic fracturing operation, if the measurement data shows that premature screen-out is likely to occur, then the short-term risk will increase and hence the short-term optimizer will try to reduce the short-term risk by sending a control signal to increase the flow rate. As such, the risk and reward analysis may change in real time according to changing conditions.

Figure 9A:
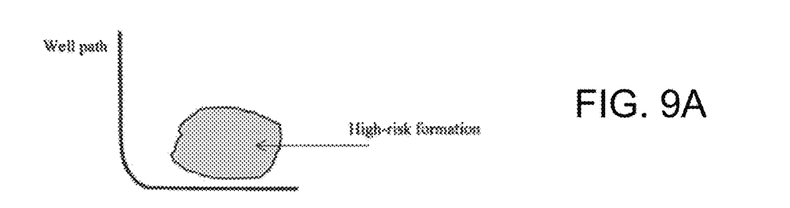
FIGS. 9A-9C are diagrams of illustrative risk and reward scenarios.
Figure 9B:
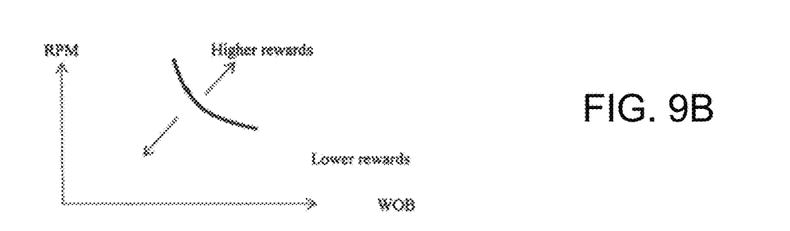
Figure 9C:
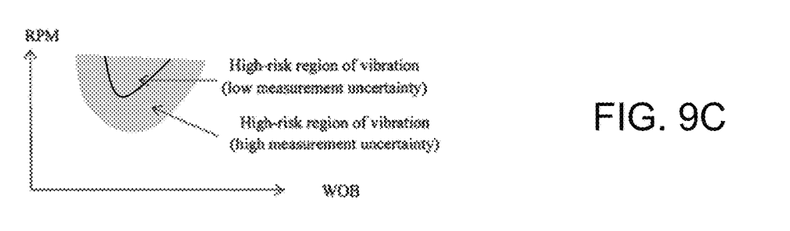

FIGS. 9A-9C are diagrams of a specific risk and reward scenarios. Specifically, risk and reward scenarios for drilling operations are shown. In FIG. 9A, a well path is shown that avoids a high-risk formation. Here, the long-term optimizer has constrained the short-term optimizers to avoid the high-risk formation, which poses a long-term risk to the drilling operation, but has left the method of avoidance (e.g. whether to drill above or below the high-risk region) to the short-term optimizers. FIGS. 9B and 9C illustrate short-term rewards and risks for the drilling operation. In terms of short-term rewards illustrated in FIG. 9B, usually a higher weight-on-bit (WOB) and drillstring rotations-per-minute (RPM) lead to higher rate-of-penetration (ROP), which is the reward. However, as illustrated in FIG. 9C there exists some operating region where BHA vibration is very likely to happen. When uncertainties in both RPM and WOB are low, the measured values of RPM and WOB are close to their true values, thus the high risk region defined is small. If the uncertainties of both variables are high, the high-risk region will inflate to reduce the possibility of vibration occurring. Through continuous minimization of the short-term cost function, the short-term optimizer will find the optimal operating point for drilling.

A system for optimizing a hydraulic fracturing operation includes an interface to equipment and sensors for performing the hydraulic fracturing operation, wherein the interface supplies control signals to the equipment and obtains measurement signals from the sensors. The system further includes a short-term optimizer module that derives a current job state based at least in part on the measurement signals, and that further adjusts the control signals to optimize a short-term cost function, the short-term cost function including a difference between the current job state and a desired job state derived from optimized values of a set of decision variables. The system further includes a long-term optimizer module that determines the optimized values based on a long-term cost function, the long-term cost function accounting for at least a long-term reward and a final state cost.

The short-term optimizer module may derive the current job state based on the measurement signals and the control signals. Deriving the current job state may be performed with an adaptive system model. The system may allocate portions of risk between the short-term cost function and the long-term cost function based on dynamic variability of those portions.

A hydraulic fracturing operation optimization method includes analyzing a formation-based model to determine optimized values for a set of decision variables subject to a long-term cost function including at least a long-term reward and a final state cost. The method further includes deriving a desired job state from the optimized values. The method further includes obtaining measurement signals from an interface to equipment and sensors for performing the hydraulic fracturing operation. The method further includes deriving a current job state based at least in part on the measurement signals. The method further includes providing, to the interface, control signals that optimize a short-term cost function, the short-term cost function including a difference between the current job state and the desired job state, the control signals controlling one or more portions of the hydraulic fracturing operation selected from the group consisting of perforation density, borehole diameter, casing diameter, perforation diameter, fracturing fluid composition, proppant composition, gel breaker composition, pump rate, and proppant schedule.

A system for optimizing a drilling fluid operation includes an interface to equipment and sensors for performing the drilling fluid operation, wherein the interface supplies control signals to the equipment and obtains measurement signals from the sensors. The system further includes a short-term optimizer module that derives a current job state based at least in part on the measurement signals, and that further adjusts the control signals to optimize a short-term cost function, the short-term cost function including a difference between the current job state and a desired job state derived from optimized values of a set of decision variables. The system further includes a long-term optimizer module that determines the optimized values based on a long-term cost function, the long-term cost function accounting for at least a long-term reward and a final state cost.

The short-term cost function may include a short-term reward including rock chips removal rate. The short-term optimizer module may derive the current job state based on the measurement signals and the control signals. Deriving the current job state may be performed with an adaptive system model.

A drilling fluid operation optimization method includes analyzing a formation-based model to determine optimized values for a set of decision variables subject to a long-term cost function including at least a long-term reward and a final state cost. The method further includes deriving a desired job state from the optimized values. The method further includes obtaining measurement signals from an interface to equipment and sensors for performing the drilling fluid operation. The method further includes deriving a current job state based at least in part on the measurement signals. The method further includes providing, to the interface, control signals that optimize a short-term cost function, the short-term cost function including a difference between the current job state and the desired job state, the control signals controlling one or more portions of the drilling fluid operation selected from the group consisting of pump rate, drilling fluid composition, fluid addition rate, rock cutting removal rate, and monitoring equivalent circulating density.

A system for optimizing a well completion operation includes an interface to equipment and sensors for performing the well completion operation, wherein the interface supplies control signals to the equipment and obtains measurement signals from the sensors. The system further includes a short-term optimizer module that derives a current job state based at least in part on the measurement signals, and that further adjusts the control signals to optimize a short-term cost function, the short-term cost function including a difference between the current job state and a desired job state derived from optimized values of a set of decision variables. The system further includes a long-term optimizer module that determines the optimized values based on a long-term cost function, the long-term cost function accounting for at least a long-term reward and a final state cost.

The short-term cost function may include a short-term reward including gravel-packing sand transport speed. The short-term cost function may include a short-term risk created by the current job state selected from the group consisting of thin gravel-packing carrier fluid and sand dune effect. The short-term optimizer module may derive the current job state based on the measurement signals and the control signals.

A well completion operation optimization method includes analyzing a formation-based model to determine optimized values for a set of decision variables subject to a long-term cost function including at least a long-term reward and a final state cost. The method further includes deriving a desired job state from the optimized values. The method further includes obtaining measurement signals from an interface to equipment and sensors for performing the well completion operation. The method further includes deriving a current job state based at least in part on the measurement signals. The method further includes providing, to the interface, control signals that optimize a short-term cost function, the short-term cost function including a difference between the current job state and the desired job state, the control signals controlling one or more portions of the well completion operation selected from the group consisting of pump rate, gravel-packing sand concentration, and polymer composition.

A system for optimizing a production chemical operation includes an interface to equipment and sensors for performing the production chemical operation, wherein the interface supplies control signals to the equipment and obtains measurement signals from the sensors. The system further includes a short-term optimizer module that derives a current job state based at least in part on the measurement signals, and that further adjusts the control signals to optimize a short-term cost function, the short-term cost function including a difference between the current job state and a desired job state derived from optimized values of a set of decision variables. The system further includes a long-term optimizer module that determines the optimized values based on a long-term cost function, the long-term cost function accounting for at least a long-term reward and a final state cost.

The short-term cost function may include a short-term reward selected from the group consisting of increase in production rate and increase in damage removal rate. The short-term cost function may include a short-term risk created by the current job state selected from the group consisting of downhole temperature change and reservoir fluid composition change. The short-term optimizer module may derive the current job state based on the measurement signals and the control signals.

A production chemical operation optimization method includes analyzing a formation-based model to determine optimized values for a set of decision variables subject to a long-term cost function including at least a long-term reward and a final state cost. The method further includes deriving a desired job state from the optimized values. The method further includes obtaining measurement signals from an interface to equipment and sensors for performing the production chemical operation. The method further includes deriving a current job state based at least in part on the measurement signals. The method further includes providing, to the interface, control signals that optimize a short-term cost function, the short-term cost function including a difference between the current job state and the desired job state, the control signals controlling one or more portions of the production chemical operation selected from the group consisting of pump rate and chemical composition.

A system for optimizing a drilling operation includes an interface to equipment and sensors for performing the drilling operation, wherein the interface supplies control signals to the equipment and obtains measurement signals from the sensors. The system further includes a short-term optimizer module that derives a current job state based at least in part on the measurement signals, and that further adjusts the control signals to optimize a short-term cost function, the short-term cost function including a difference between the current job state and a desired job state derived from optimized values of a set of decision variables. The system further includes a long-term optimizer module that determines the optimized values based on a long-term cost function, the long-term cost function accounting for at least a long-term reward and a final state cost.

The short-term cost function may include a short-term reward selected from the group consisting of weight-on-bit and drillstring rotations-per-minute. The short-term cost function may include a short-term risk created by the current job state including a region of vibration. The short-term optimizer module may derive the current job state based on the measurement signals and the control signals. The current job state may be performed with an adaptive system model. The system may allocate portions of risk between the short-term cost function and the long-term cost function based on dynamic variability of those portions. The long-term cost function may include one or more long-term rewards selected from the group consisting of total length drilled, maximum dogleg severity, and rate of penetration.

A drilling operation optimization method includes analyzing a formation-based model to determine optimized values for a set of decision variables subject to a long-term cost function including at least a long-term reward and a final state cost. The method further includes deriving a desired job state from the optimized values. The method further includes obtaining measurement signals from an interface to equipment and sensors for performing the drilling operation. The method further includes deriving a current job state based at least in part on the measurement signals. The method further includes providing, to the interface, control signals that optimize a short-term cost function, the short-term cost function including a difference between the current job state and the desired job state, the control signals controlling a trajectory of a bottomhole assembly.

A system for optimizing a hydraulic workover operation includes an interface to equipment and sensors for performing the hydraulic workover operation, wherein the interface supplies control signals to the equipment and obtains measurement signals from the sensors. The system further includes a short-term optimizer module that derives a current job state based at least in part on the measurement signals, and that further adjusts the control signals to optimize a short-term cost function, the short-term cost function including a difference between the current job state and a desired job state derived from optimized values of a set of decision variables. The system further includes a long-term optimizer module that determines the optimized values based on a long-term cost function, the long-term cost function accounting for at least a long-term reward and a final state cost.

The short-term cost function may include a term representing a short-term reward including increased hydraulic workover pipe insertion speed. The short-term cost function may include a short-term risk created by the current job state comprising pressure release. The short-term optimizer module may derive the current job state based on the measurement signals and the control signals. Deriving the current job state may be performed with an adaptive system model. The system may allocate portions of risk between the short-term cost function and the long-term cost function based on dynamic variability of those portions. The long-term cost function may include long-term risks including incorrect hydraulic workover pipe location. The long-term cost function may include one or more long-term rewards selected from the group consisting of increased hydraulic workover pipe insertion speed and accurate hydraulic workover pipe location.

A hydraulic workover operation optimization method includes analyzing a formation-based model to determine optimized values for a set of decision variables subject to a long-term cost function including at least a long-term reward and a final state cost. The method further includes deriving a desired job state from the optimized values. The method further includes obtaining measurement signals from an interface to equipment and sensors for performing the hydraulic workover operation. The method further includes deriving a current job state based at least in part on the measurement signals. The method further includes providing, to the interface, control signals that optimize a short-term cost function, the short-term cost function including a difference between the current job state and the desired job state, the control signals controlling one or more portions of the hydraulic workover operation selected from the group consisting of force of hydraulic workover pipe insertion, speed of hydraulic workover pipe insertion, type of hydraulic workover pipe, composition of hydraulic workover pipe, and diameter of hydraulic workover pipe.

The long-term cost function may include one or more long-term rewards selected from the group consisting of increased hydraulic workover pipe insertion speed and accurate hydraulic workover pipe location. The long-term cost function may include long-term risk including incorrect hydraulic workover pipe location. The method may include allocating portions of risk between the short-term cost function and the long-term cost function based on dynamic variability of those portions.

A system for optimizing a logging operation includes an interface to equipment and sensors for performing the logging operation, wherein the interface supplies control signals to the equipment and obtains measurement signals from the sensors. The system further includes a short-term optimizer module that derives a current job state based at least in part on the measurement signals, and that further adjusts the control signals to optimize a short-term cost function, the short-term cost function including a difference between the current job state and a desired job state derived from optimized values of a set of decision variables. The system further includes a long-term optimizer module that determines the optimized values based on a long-term cost function, the long-term cost function accounting for at least a long-term reward and a final state cost.

The short-term cost function may include a short-term risk created by the current job state selected from the group consisting of increased measurement noise and biased measurements. The short-term optimizer module may derive the current job state based on the measurement signals and the control signals. Deriving the current job state may be performed with an adaptive system model. The system may allocate portions of risk between the short-term cost function and the long-term cost function based on dynamic variability of those portions. The long-term cost function may include long-term risks selected from the group consisting of inaccurate formation model and inaccurate reservoir model. The long-term cost function may include one or more long-term rewards selected from the group consisting of increased logging speed and increased logging resolution.

A logging operation optimization method includes analyzing a formation-based model to determine optimized values for a set of decision variables subject to a long-term cost function including at least a long-term reward and a final state cost. The method further includes deriving a desired job state from the optimized values. The method further includes obtaining measurement signals from an interface to equipment and sensors for performing the logging operation. The method further includes deriving a current job state based at least in part on the measurement signals. The method further includes providing, to the interface, control signals that optimize a short-term cost function, the short-term cost function including a difference between the current job state and the desired job state, the control signals controlling one or more portions of the logging operation selected from the group consisting of selection of logging tool and speed of logging tool.

A system for optimizing a cementing operation includes an interface to equipment and sensors for performing the cementing operation, wherein the interface supplies control signals to the equipment and obtains measurement signals from the sensors. The system further includes a short-term optimizer module that derives a current job state based at least in part on the measurement signals, and that further adjusts the control signals to optimize a short-term cost function, the short-term cost function including a difference between the current job state and a desired job state derived from optimized values of a set of decision variables. The system further includes a long-term optimizer module that determines the optimized values based on a long-term cost function, the long-term cost function accounting for at least a long-term reward and a final state cost.

The short-term cost function may include a short-term reward including increased cement pumping rate. The short-term cost function may include a short-term risk created by the current job state selected from the group consisting of mud bubble, uneven cement surface, and poor cement bond. The short-term optimizer module may derive the current job state based on the measurement signals and the control signals. Deriving the current job state may be performed with an adaptive system model. The system may allocate portions of risk between the short-term cost function and the long-term cost function based on dynamic variability of those portions. The long-term cost function may include long-term risks selected from the group consisting of loss of cement integrity and low fracture gradient. The long-term cost function may include one or more long-term rewards selected from the group consisting of increased cement integrity, decreased wait-on-cement time, and decreased material cost.

A cementing operation optimization method includes analyzing a formation-based model to determine optimized values for a set of decision variables subject to a long-term cost function including at least a long-term reward and a final state cost. The method further includes deriving a desired job state from the optimized values. The method further includes obtaining measurement signals from an interface to equipment and sensors for performing the cementing operation. The method further includes deriving a current job state based at least in part on the measurement signals. The method further includes providing, to the interface, control signals that optimize a short-term cost function, the short-term cost function including a difference between the current job state and the desired job state, the control signals controlling one or more portions of the cementing operation selected from the group consisting of cement type and cement composition.

The long-term cost function may include long-term risks selected from the group consisting of loss of cement integrity and low fracture gradient. The long-term cost function may include one or more long-term rewards selected from the group consisting of increased cement integrity, decreased wait-on-cement time, and decreased material cost. The method of claim may include allocating portions of risk between the short-term cost function and the long-term cost function based on dynamic variability of those portions.

While the present disclosure has been described with respect to a limited number of embodiments, those skilled in the art will appreciate numerous modifications and variations therefrom. It is intended that the appended claims cover all such modifications and variations.

What is claimed is:

1. A system for optimizing a running operation, comprising:
    an interface to equipment and sensors for performing the running operation, wherein the interface supplies control signals to the equipment and obtains measurement signals from the sensors;
    at least one short-term optimizer module that derives a current job state based at least in part on the measurement signals, and that further adjusts the control signals to optimize a short-term cost function, the short-term cost function comprising:
        short-term risks and short-term rewards; and
        a difference between the current job state and a desired job state derived from optimized values of a set of decision variables; and
    a long-term optimizer module, coupled to the at least one short-term optimizer module, that determines the optimized values based on a long-term cost function, the long-term cost function comprising long-term risks and long-term rewards and accounting for at least a long-term reward and a final state cost, wherein:
        the control signals control running operations equipment;
        the short term-risks are promoted to long-term risks when the short-term risks persist over a threshold time period; and
        the short-term rewards and risks and the long-term rewards and risk comprise non-financial rewards and risks.

2. The system of claim 1, wherein the short-term optimizer module derives the current job state based on the measurement signals and the control signals.

3. The system of claim 1, wherein deriving the current job state is performed with an adaptive system model.

4. The system of claim 1, wherein the system allocates portions of risk between the short-term cost function and the long-term cost function based on dynamic variability of the portions.

5. The system of claim 1, wherein the running operation comprises a drilling operation.

6. The system of claim 5, wherein the short-term reward is selected from the group consisting of weight-on-bit and drillstring rotations-per-minute.

7. The system of claim 5, wherein the short-term risk is created by the current job state comprising a region of vibration.

8. The system of claim 5, wherein the long-term reward is selected from the group consisting of total length drilled, maximum dogleg severity, and rate of penetration.

9. The system of claim 1, wherein the running operation comprises a logging operation.

10. The system of claim 9, wherein the short-term risk is created by the current job state selected from the group consisting of increased measurement noise and biased measurements.

11. The system of claim 9, wherein the long-term risk is selected from the group consisting of inaccurate formation model and inaccurate reservoir model.

12. The system of claim 9, wherein the long-term reward is selected from the group consisting of increased logging speed and increased logging resolution.

13. The system of claim 1, wherein the running operation comprises a hydraulic workover operation.

14. The system of claim 13, wherein the short-term reward comprises an increased hydraulic workover pipe insertion speed.

15. The system of claim 13, wherein the short-term risk is created by the current job state comprising pressure release.

16. The system of claim 13, wherein the long-term risk comprises an incorrect hydraulic workover pipe location.

17. A running operation optimization method, comprising:
    Analyzing, by a long-term optimizer module, a formation-based model to determine optimized values for a set of decision variables subject to a long-term cost function comprising at least a long-term reward, long-term reward, and a final state cost;
    deriving a desired job state from the optimized values;

obtaining measurement signals from an interface to equipment and sensors for performing the running operation;
deriving a current job state based at least in part on the measurement signals; and
providing, to the interface, control signals that optimize a short-term cost function, by at least one short-term optimizer module coupled to the long-term optimizer module, the short-term cost function comprising:
short-term risks and short-term rewards; and
a difference between the current job state and the desired job state, wherein:
the control signals control running operations equipment;
the short-term risks are promoted to long-term risks when the short-term risks persist over a threshold time period; and
the short-term rewards and risks and the long-term rewards and risk comprise both non-financial and financial rewards and risks.

18. The method of claim 17, wherein the running operation comprises a drilling operation, the control signals controlling a trajectory of a bottomhole assembly.

19. The method of claim 17, wherein the running operation comprises a logging operation, the control signals controlling one or more portions of the logging operation selected from the group consisting of selection of logging tool and speed of logging tool.

20. The method of claim 17, wherein the running operation comprises a hydraulic workover operation, the control signals controlling one or more portions of the hydraulic workover operation selected from the group consisting of force of hydraulic workover pipe insertion, speed of hydraulic workover pipe insertion, type of hydraulic workover pipe, composition of hydraulic workover pipe, and diameter of hydraulic workover pipe.

* * * * *